June 27, 1933.   F. L. PRESTON   1,915,799
METHOD OF RECOVERING NOBLE METALS FROM FERRUGINATE ORES
Filed Dec. 29, 1930
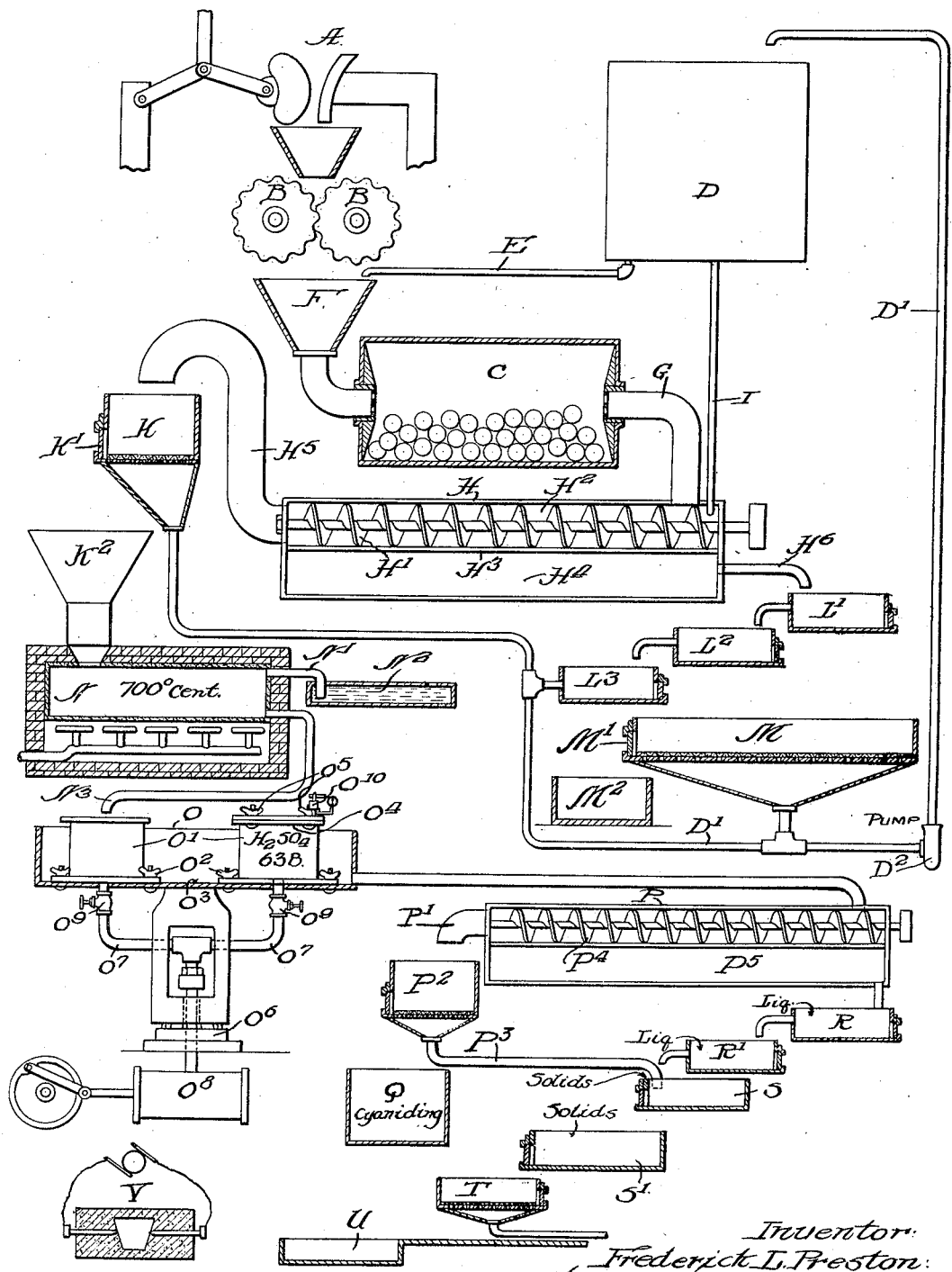
Inventor:
Frederick L. Preston
By Wilkinson, Huxley, Byron & Knight
Att'ys
Witness:
R. B. Davison Patented June 27, 1933

1,915,799

UNITED STATES PATENT OFFICE

FREDERICK L. PRESTON, OF MOBILE, ALABAMA

METHOD OF RECOVERING NOBLE METALS FROM FERRUGINATE ORES

Application filed December 29, 1930. Serial No. 505,335.

This invention relates to a process for recovering gold and other noble metal values found associated in nature with ferruginate ore, or other like situation, for instance, the ore found in large quantities at the southern end of the Appalachian System in this country in Alabama and contiguous southern States. These ores are mainly hematite with some magnetite, and in them I have discovered the existence of noble metals in economically recoverable proportions, and particularly gold, along with palladium, platinum, osmiridium, other platinates, etc.

Whie I am not prepared to explain the natural phenomenon of the existence of these noble metal values in the situation referred to, or positively identify their precise chemical constituency, evidence of one time marine submergence of the ferruginates in which these values are found suggests the hypothesis of precipitation of the values upon the iron oxides by reaction of the iron upon sea water solutions of the trivalent chlorides, bromides or iodides of such noble metals to form relatively insoluble univalent salts thereof, although some conditions encountered in my research suggest the presence of the values in at least small proportions in metallic or native form. But my invention does not depend for identification upon any theory, explanation or analysis of the conditions under which the values exist, but rather upon a method of procedure which I have found to be economically effective in the recovery of values from ores of the character described, and which I believe to be applicable to other ores where values exist under similar conditions, or even applicable to ores similarly conditioned, for instance, by the subjection of ferruginate or equivalent ores to the action of sea water for a sufficient period to precipitate thereon or therein insoluble salts from the noble metal salts in solution in the sea water.

The invention proceeds upon the principle of—First: Subjecting the ore to a combined chlorinating and distilling operation with the effect of driving off more recalcitrant elements such as osmium or osmiridium which will be accompanied by chlorides of non-metallic elements since they too are volatile, and rendering the gold and other associates responsive to an acid conversion; this step in the procedure being preferably performed in a furnace capable of developing around 700° C., the material being introduced thereinto in a state of saturation with a solution of sodium chloride or other source of chlorine, and the fumes being collected under water for the sake of the values driven off therewith; another preferable incident to this furnace chlorinating step being the previous grinding of the ore in the presence of a chlorine source, such as sodium chloride, with the effect of saturating the material with the chlorine bearing material, influencing the specific gravity of the material to the extent of making it more readily classifiable, and rendering the ore more susceptible to the several chemical reactions to which it must subsequently be subjected. Second: Subjecting the chlorinated ore to the action of sulphuric acid or its equivalent under conditions which will convert substantially all of the salts of the noble metal values from relatively insoluble univalent chlorides and any native or metallic noble metal values into soluble trivalent chlorides; this step in the procedure being preferably performed by depositing hot chlorinated and dried, pulverized or granulated ore into water or a solution of the chlorine salts in water and then adding to the bath sulphuric acid in a suitable proportion, for instance, about three pounds of the acid of about 63 Bé. strength for each ounce of noble metal found by previous analysis to be contained in the ore; the subjection of the chlorinated ore to this acidulated bath being carried out in a closed container under pressure and with access to a nitrogen source, for instance, in the presence of air at a material pressure above atmosphere, for instance upwards of four atmospheres, with the air introduced under conditions that cause ebullition through the bath, for instance, by throttling escape of the air to a degree that will build up the pressure while permitting continued introduction and ebullition of the air, and this procedure being continued for from three to six hours according to the proportion of mineral values found by the previous analysis to exist in the ore. Third: Causing this acid conversion step, which puts most of the values into the condition of wet chlorides, to be followed by known methods of precipitating noble metal values from their soluble chlorides. Fourth: Converting these precipitated values into metallic form, and separating the metal from the mass.

It is my belief that depositing the hot chlorinated ore in water which either contains or is subsequently made to contain sulphuric acid in a proportion appropriate to the quantity of noble metal values in the chlorinated ore, and bringing air into intimate association with the bath, has the effect of supplying the elements of aqua regia, which not only converts the univalent to trivalent chlorides, but salvages any of the noble metals existing in the ore in native or metallic form but too finely subdivided to be observable.

In carrying out the invention, special attention may, with advantage, be given to proper physical conditioning of the ore; classification of the physically conditioned ore into different grades of fineness; treatment of these different grades separately in order to improve economic conditions of the treatment; free use of the saline or other chlorine bearing solution as a vehicle wherever necessary for facilitating manipulation of the materials; salvaging the chlorine bearing solution from dewatering and other points of discharge, and returning it for rectification and reuse; subjecting tailings to cyaniding; etc.—all of which will be hereinafter referred to in identifying collateral or subordinate features of the invention.

In order that the invention may be fully understood, a typical procedure will now be described in connection with the accompanying drawing, schematically representing a mill or plant adapted to practice the preferred embodiment of the invention.

Ferruginate ore of the kind described, say hematite ($Fe_2O_3$) with some magnetite ($Fe_3O_4$) and bearing noble metal values that are to be recovered suitably preconditioned, for instance, by passing it through crushing jaws A and rolls B, is introduced into the wet pulverizer or ball mill C where it is ground to a sufficient degree of fineness to open up the entire material to the reagent; the grinding being carried on in the presence of a chlorine bearing solution, such, for instance, as a saturated solution of sodium chloride, delivered from a storage source D through pipe E and hopper F to the cylinder of the ball mill in a proportion which causes the pulverized material to issue from the mill C through its discharge channel G in the condition of fluid sludge. Sludge issuing at G will contain a considerable proportion of granular or coarse material in addition to the finely pulverized material, and for this reason the sludge is passed into a classifier H of any suitable known construction, for instance, one in which the material will be agitated and fed by the screw $H'$ through one longitudinal compartment $H^2$ of the classifier, while the sludge is being constantly thinned by an additional supply of saline solution through the pipe I and with the effect of causing the fines to be borne by the saline solution as a vehicle over the partition $H^3$ into the second compartment $H^4$, so that while coarse material contained in the sludge from the ball mill will pass through the channel $H^5$ to a dewaterer K, the fines borne by the saline solution as a vehicle will flow through the outlet $H^6$ to a series of settling tanks $L'$, $L^2$, $L^3$, from which these fines may subsequently be scraped and caused to enter a dewaterer M. Coarse dewatered solids from the dewaterer K impregnated with the chloride solution escape through the channel $K'$ to the hopper $K^2$ of a converter furnace N where they are subjected to a temperature of around 700° C. for a sufficient time to thoroughly dry the solids, chlorinate the values therein, and drive off recalcitrant elements, such as Osmium or Osmiridium, through the flue $N'$ into a fume absorber $N^2$ since chlorides of non-metallic elements are volatile, they too will pass off as fumes. Similarly, solids collected in the settling chambers $L'$, $L^2$, $L^3$ and relieved of their excessive saline solution in the dewaterer M, will be scraped from the screen in dewaterer M, out through gate $M'$, into receiver $M^2$ and thence removed at convenient times and also subjected to the converter furnace N, for instance, by depositing them in the hopper $K^2$, whence they enter said furnace where calcining is carried on in the presence of air and the reaction between the metallic elements and the chlorine takes place.

Chloridized solids from the furnace N, whether they be of the coarse grade derived from the dewaterer K or the fine grade derived from the settling tanks $L'$, $L^2$, $L^3$, are subjected to acid conversion in a suitable apparatus, such, for instance, as that shown at O, where $O'$ indicates two flanged open ended cylinders, respectively clamped at $O^2$ to the bottom $O^3$ of the vat O, and adapted to be closed by covers $O^4$ releasably secured by bolts $O^5$; the vat O being rotatable upon its support $O^6$ so as to bring either cylinder $O'$ beneath the discharge spout $N^3$ of the furnace N in order to charge into the respective cylinders $O'$ the hot chlorinated material from the furnace. At the time of such discharge, the cylinder $O'$ will contain water or a saturated solution of the chlorine bearing substance in water, to a suitable level to submerge the deposited material, and before applying the cover $O^4$ sulphuric acid will be added in a suitable proportion, for instance, three pounds of acid at 63 Bé. to each ounce of noble metal believed to exist in the material being treated—three pounds to the ounce being found effective to recover substantially all the values. Upon receiving the charge of material from the outlet $N^3$ of the furnace, the vat O will be swung to take the container $O'$ away from the discharge, at which time the acid will be added and the cover $O^4$ applied.

Vat O has a charging pipe O⁷ through which compressed air from any suitable source O⁸ can be delivered to either of the containers O′ under control of their valves O⁹, and the covers have controllable vents O¹⁰ which may be regulated to permit air to escape with a throttling effect that will build up pressure within the container O′ to around sixty-five pounds to the square inch, but still permit air to enter continuously and with ebullition effect that thoroughly aerates the bath and provides, by its own nitrogen accompanied by the water of the bath and the chlorine, reagents which when acted upon by the sulphuric acid produce, in my opinion, hydrochloric and nitric acids which together form aqua regia sufficient to convert any metallic values into soluble chlorides while the sulphuric acid also converts the chlorinated insoluble univalent chlorides into soluble trivalent chlorides, so that after the mass has been permitted to set for an appropriate time, in the converter O, the values will nearly all exist as wet chlorides, and the solids, except for the cleaning up of values by cyaniding, may be treated as tailings. These wet chlorides and solids are now separated by any suitable method, for instance, by subjecting them to the apparatus now to be described.

P represents a second classifier into which material finished in the acid converter O, is discharged and separated into leached coarse products and fines as in the case of the classifier H. It will be understood that these classifiers are here represented as two parallel troughs which are supposed to be on the same level and separated by a longitudinal partition so that when the converted material, consisting of values in solution and solids borne by the solution as a vehicle, is delivered into the trough containing the feed screw, the coarse particles will settle and be discharged by the screw through the spout P¹ into the filter or dewaterer P² whence the solids may be scraped into the cyaniding tank Q while the liquid containing values in solution, will flow through pipe P³ into one of the caustic soda tanks S; and the fines and greater body of the fluid containing values in solution, will overflow the partition P⁴ of the classifier, into the trough P⁵ and escape thence into the first of a series of settling tanks R, R¹, et cetera, from which the said liquid containing the values in solution ultimately reaches the caustic soda tank S. The reaction that takes place in the caustic soda tank S or plurality of said tanks S, S¹, causes the values to be now precipitated as solids and after ample time is allowed for the reaction, the last caustic soda tank is emptied of its contents, both solid and liquid, into the dewaterer or filter T, whence the liquid escapes as waste or such residual treatment as may be desirable, and from which the values, remaining above the filter body, may be transferred on to the mixing floor U, where it will arrive in a wet condition, and after which it is treated to sufficient hydrochloric acid to neutralize any alkali remaining in the mixture of the mass from the caustic soda step, and sufficient at the same time to convert all of the metals, excepting those noble metals existing in native form, into acid solution or oxides; whereupon this thick fluid or viscous acid mass has mixed with it a preparation commercially known as "Blue Powder" and which consists mainly or wholly of metallic zinc in the form of flue dust or other finely subdivided form, which takes up all of the hydrochloric acid that was combined with the noble metals without disturbing the iron or other base metal oxides, and precipitates in metallic form these noble metal values that were formerly in solution while leaving the base metal oxides in solution to be drawn off with the liquid remaining from the reaction. The precipitated noble metals together with such noble metal values as existed in the original mineral, will now be collected in a known manner, as by smelting in the presence of litharge, native lead, silver or equivalent vehicular metal body, from which the gold and other values sought can subsequently be separated by electrolysis, cutting out with acid, or other approved means.

As a specific embodiment of the invention, take ferruginous ore such as is found in abundance in southern Alabama and consisting mainly of hematite; grind this ore in the presence of a saturated solution of sodium chloride, calcium chloride or other chlorine source in sufficient proportions to bring the mass to thick viscous sludge; subject this sludge to such classifying steps as may be desirable to facilitate handling and subsequent reactions, for instance, to separate granular or other insufficiently pulverized portions; separate such excess of the saline or chlorine bearing liquid as may have been used for convenience in moving the mass: introduce into a calcining furnace the mass of finely subdivided ore with such proportion of saline solution as will cause it to have a thick viscous condition, thereby determining the proportion of chlorine to ore, and subject the mass, in the presence of atmosphere, to a temperature of about 700° C.; then while the mass is still at red heat, discharge it into a reaction chamber containing sulphuric acid in the proportion of about three pounds of acid at about 63° Bé. to each ounce of noble metal estimated by analysis to be present in the material; hermetically close this reaction chamber except for the escape of excessive pressure that may develop therein, and inject into the same, in agitating relation to the contents, air under pressure for a period of several hours or a time sufficient to insure intimate access of the sulphuric acid reagent to all parts of the mineral, and thereby convert the chlorides that are insoluble or not readily soluble into wet or soluble chlorides; permit the resultant contents of the reaction chamber to settle until the liquid portion thereof is clear; draw off this liquid, which will now contain the metal values as well as base metals in solution; subject this clear solution thus drawn off to the action of caustic soda and thereby throw down all the metals, each in the form of a salt of the metal; draw off the liquid of the reaction; acidulate the remaining mass of metal salts with muriatic acid in quantity sufficient to neutralize the alkalinity of the remanent liquid that moistens the precipitate and again place in solution all of the metal oxide contained in the mass, the quantity of acid added, however, being only sufficient to leave the material as a thick fluid or viscous reddish mass which contains the values principally in solution but also in native form to the extent that the original ore contained native values; then mix with the viscous mass last mentioned finely subdivided metallic zinc in quantity sufficient to take up that portion of the acid solvent of the noble metals in solution and cause the latter to precipitate in metallic form; and finally, recover the precipitated values by known methods.

As stated, furnace N will preferably have a flue $N^1$ for fumes developing during the drying operation, and since these fumes will contain values, the flue leads to a collecting chamber $N^2$ containing water or saline or other chlorine bearing solution in which these fumes are collected. After use of the furnace for a sufficient period of time the liquid in the fumes collecting chamber $N^2$ may be treated appropriately to recover the values therein, by the process already described, namely, acid conversion of insoluble into soluble chlorides; rendering these chlorides alkaline to precipitate their values as solids; treatment of these solids with hydrochloric acid to neutralize any remaining alkali and convert their values into acid solution of oxides preferably in the form of a viscous mass; and then mixing with this mass finely subdivided zinc or blue powder to render its values metallic, and then reducing it to bullion.

The settlings in the tank R or R' will contain some remanent values, chiefy irridium and osmium, but likewise some platinates and even gold which by reason of the recalcitrant nature of the osmium and irridium did not enter into the solution, and this refuse may be treated for their recovery as a separate procedure which will consist mainly in the blue powder process and subsequent steps. The proportions of metals to refuse is such that it will be more economical to treat this refuse separately than in conjunction with the caustic soda precipitate from the values in solution.

At various steps along the line where dewatering takes place, except when the values are in solution and except where the caustic has been used, the liquid from the dewaterer may be returned to the storage tank for the chlorine supplying liquid, and this economy renders it practicable to use rather freely the solution of salt or other chlorine supplying material where liquid becomes important as a vehicle to speed the sequence of the steps in the procedure.

In the interest of economy, both with respect to conserving chlorine bearing fluid and returning to the process any values that may be borne off therein, a pipe D' leading from the dewaterers K and M, as well as certain of the settling tanks, for instance, tank $L^3$, leads back to the saline solution tank D and includes a pump $D^2$ for forcing liquid therein.

I claim:

1. In the process of recovering gold or other noble metal value from ferruginous ore, the improvement which consists in chloridizing both noble and base metals contained in the ore; subjecting the resultant chloridized ore to the reaction of sulphuric acid and thereby converting the noble and other metallic constituents of the ore into soluble chlorides thereof; subjecting a solution of said chlorides to the reaction of caustic soda and thereby precipitating metals of the ore in oxide form; subjecting the precipitated oxides to the reaction of an acid which places the metals of the ore in acid solution; and then causing the last-named solution to react with a base that will free the noble metal values in the form of precipitated metal while leaving base metal constituents in the acid solution.

2. The process described in claim 1, in which the step of chloridizing the metal constituents in the ore is performed by calcining the ore in subdivided physical form in the presence of a chloride, and the ensuing step of rendering the chloridized metals soluble is performed by discharging the calcined material at high temperature into a sulphuric acid bath.

3. The process described in claim 1, in which the step of causing the solution last named in the claim to react with a base, includes the use of zinc powder as such base.

Signed at Chicago, Illinois, this 24th day of December, 1930.

FREDERICK L. PRESTON.